(12) United States Patent
Guttmann et al.

(10) Patent No.: US 6,484,359 B1
(45) Date of Patent: Nov. 26, 2002

(54) LOAD INDICATING SPRING CASTER

(75) Inventors: Craig J. Guttmann, Thornhill (CA); Sean Guttmann, Thornhill (CA); Peter DePinto, Brampton (CA); Csaba Lemak, Richmond Hill (CA)

(73) Assignee: Algood Casters Limited, Weston (CA)

( * ) Notice: Subject to any disclaimer, the term of this patent is extended or adjusted under 35 U.S.C. 154(b) by 79 days.

(21) Appl. No.: 09/593,518

(22) Filed: Jun. 14, 2000

(51) Int. Cl.[7] .............................................. B60B 33/00
(52) U.S. Cl. ............................ 16/18 R; 16/35 R; 16/44
(58) Field of Search ...................... 16/18 R, 44, 35 R, 16/30, 23, 19

(56) References Cited

U.S. PATENT DOCUMENTS

| | | |
|---|---|---|
| 2,227,875 A | 1/1941 | Boden |
| 2,687,293 A | 8/1954 | Jackson |
| 2,707,795 A | 5/1955 | Skupas |
| 3,041,656 A | 7/1962 | Goodall |
| 3,190,383 A | 6/1965 | Fountain |
| 3,566,433 A | 3/1971 | Lewin |
| 4,102,295 A | 7/1978 | Crook |
| 4,198,921 A | 4/1980 | Horton |
| 4,534,433 A | 8/1985 | Burbank |
| 4,559,669 A * | 12/1985 | Bonzer et al. ................. 16/44 |
| 4,763,910 A | 8/1988 | Brandli |
| 4,932,476 A | 6/1990 | Hoehn |
| 5,103,530 A * | 4/1992 | Andrisin et al. ............... 16/20 |
| 5,347,680 A | 9/1994 | Rippe |
| 5,400,469 A | 3/1995 | Simonsen |
| 5,581,843 A | 12/1996 | Purnell |
| 5,797,252 A * | 8/1998 | Goman ....................... 56/17.2 |
| 5,823,278 A | 10/1998 | Geringer |
| 5,831,221 A * | 11/1998 | Geringer et al. ............ 177/144 |
| 5,861,582 A | 1/1999 | Flanagan |
| 6,293,570 B1 * | 9/2001 | Gottschalk et al. .... 280/86.751 |

FOREIGN PATENT DOCUMENTS

JP    2001170117 A   *   6/2001

* cited by examiner

Primary Examiner—Anthony Knight
Assistant Examiner—Mark Williams
(74) Attorney, Agent, or Firm—Riches, McKenzie & Herbert LLP

(57) ABSTRACT

A spring-loaded caster with an indicator to indicate the load applied to the caster.

14 Claims, 7 Drawing Sheets

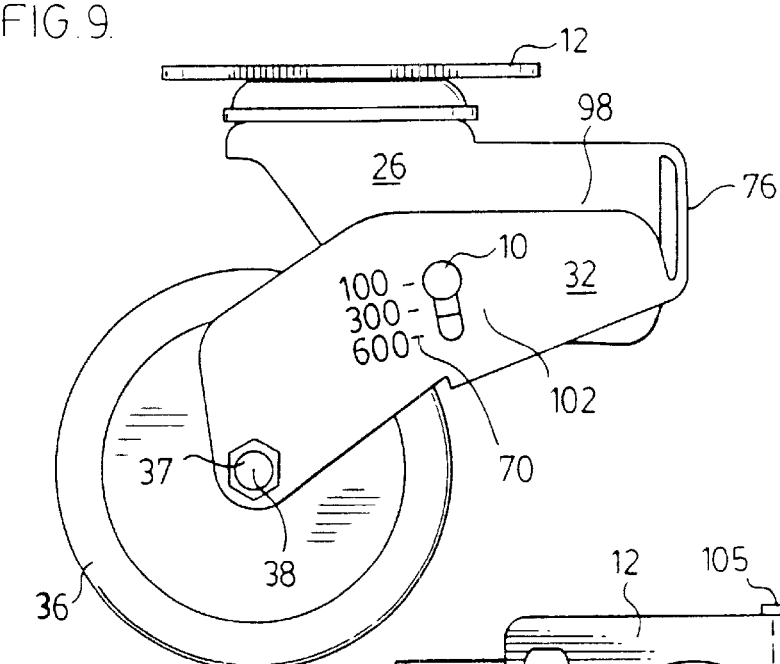
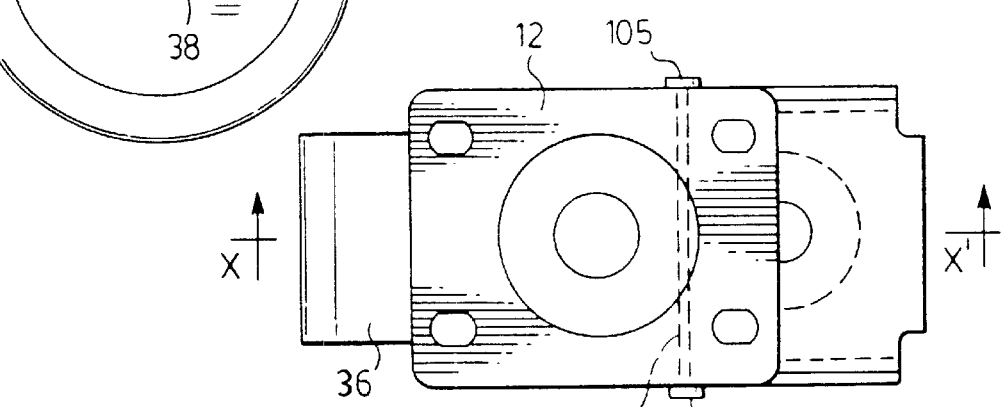
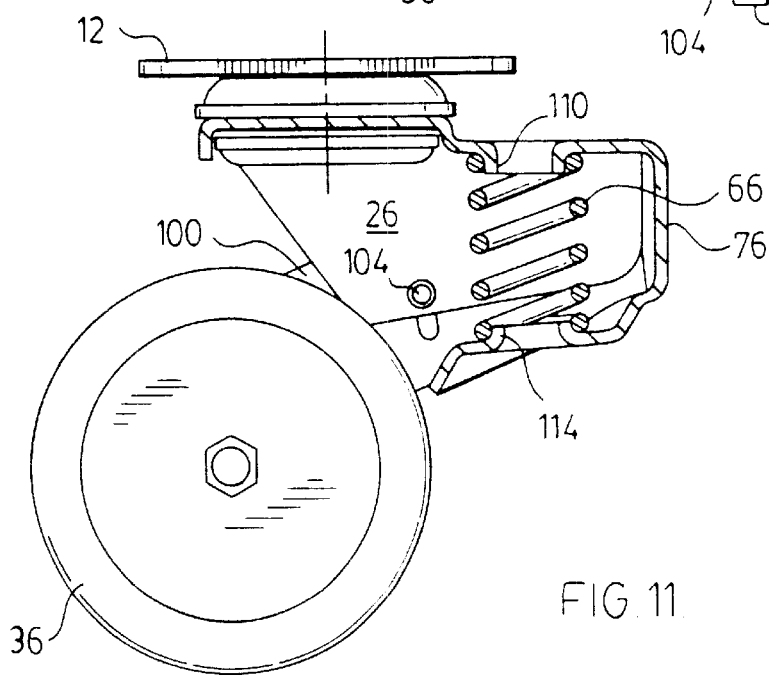

LOAD INDICATING SPRING CASTER

FIELD OF THE INVENTION

This invention relates to spring-loaded casters and, more particularly, to lever action casters with shock absorbing springs.

BACKGROUND OF THE INVENTION

Mechanisms are known to mount wheels as, for example, via casters and with the wheel being secured in a manner that with increased loading the support for the wheel becomes deflected as by the deflection of a spring.

Previously known devices suffer the disadvantage that it is difficult to know whether a spring-loaded caster is being subjected to loads which exceed preferred operational limits for the spring.

Previously known devices also suffer the disadvantage that relatively complex structures are required for mounting of a wheel to a support so as to permit the wheel to be supported in a spring biased manner.

SUMMARY OF THE INVENTION

To at least partially overcome the disadvantages of the previously known devices, the present invention provides a caster carrying a gauge by which the load carried by the caster is displayed visible to a user. The invention is directed to provide an indicating system such that the caster can be visually inspected to determine the load which it is bearing and to see if it is within preferred limits.

To overcome disadvantages of the previously known devices, the present invention also provides a simplified construction for a wheel mount in which the supporting structure itself deflects under loads.

An object of the present invention is to provide in a spring-loaded caster, an indicating system such that the caster can be visually inspected to see the load which it is bearing.

Another object is to provide a simplified support for mounting a wheel in which the support structure itself deflects under load.

Another object is to provide a simplified construction for a spring-loaded caster in which a support for the wheel comprises a unitary element.

The invention provides a spring-loaded caster with an indicator to indicate the load applied to the caster. The spring-loaded caster has a wheel mounted to a lever which pivots relative a support against the bias of a spring when loads are applied. The indicator preferably has a first indicator component on the lever and a second indicator component on the support. The two indicator components are located adjacent each other so that their relative positions indicate loading on the caster and can be easily seen by the human eye while the caster is in use.

Swiveling casters typically swivel about a substantially vertical swivel axis. The caster has a wheel which is journalled for rotation about a horizontal wheel axis. The wheel axis is typically horizontally spaced from an extension of the swivel axis and this spacing or offset frequently is a significant factor in determining safe loads which can be carried without failure. The present invention is particularly advantageous with swiveling casters where wheel axis are offset from the swivel axis. In providing a load indicating system, a method is provided preferably sensed visually by which loads can be kept in a safe range. Sensing, of course, could also be via electronic or other automatic indication and sensing devices than merely visual inspection or indication.

The invention also provides a novel construction for a wheel mount assembly in which a resilient member can serve to couple the wheel supporting lever to a support for deflection to provide relative movement of the lever and support under varying loads. The resilient member can serve as a primary biasing device which resists relative movement of the lever and support or can be complemented by an additional spring.

In one aspect, the present invention provides a caster assembly comprising a mounting member mountable to an article, a support member mounted to the mounting member for swiveling about a support axis, an elongate lever pivotably coupled to the support member for pivoting of the lever relative the support member about a pivot axis generally normal to the support axis, a wheel rotatably mounted to the lever for rotation about a wheel axis spaced from the pivot axis and parallel the pivot axis;

a spring member disposed between the lever and the support member such that pivoting of the lever relative the support member about the pivot axis at least in one direction deflects the spring member, a support indicator carried by the support member spaced from the pivot axis radially relative the pivot axis, a lever indicator carried by the lever spaced from the pivot axis radially relative the pivot axis, the support indicator and lever indicator disposed in juxtapositioned complementary relation to move relative each other on pivoting of the lever relative the support member about the pivot axis and provide a visual indication of the extent of deflection of the spring member.

In another aspect, the present invention provides a wheel support assembly comprising a support member adapted to be coupled to an article, an elongate lever member having a first end and a second end, a first spring member coupling the first end of the lever member to the support member, a wheel rotatably mounted to the second end of the lever member for rotation about a wheel axis spaced from the first spring member, the first spring member comprising a resilient member which on deflection under loads applied to the wheel assembly moves the second end of the lever member carrying the wheel relatively closer to or farther away from the support member between extended and retracted positions while maintaining the wheel axis in all different positions between the extended and retracted positions parallel the orientation of the wheel axis in the extended position.

In another aspect, the present invention provides a wheel assembly comprising:

an elongate generally U-shaped flex member having a first leg and a second leg joined by a bridging bight, the first leg comprising a support portion adapted to be secured to an article, the second leg having a wheel rotatably mounted thereto for rotation about a wheel axis, the bight comprising a resilient first spring member which resiliently deflects under loads applied between the support portion and the wheel to move the wheel relatively closer to or farther away from the support portion between respective retracted and extended positions, the flex member maintaining the wheel axis in all different positions between the retracted position and the extended position parallel an orientation of the wheel axis in the extended position.

In another aspect, the present invention provides a wheel support assembly comprising:

a support member adapted to be coupled to an article, a spring member having a first end and a second end, an lever member having a first end and a second end, a wheel rotatably mounted to the second end of the lever for rotation about a wheel axis, the first end of the spring member fixedly secured to the support member and the first end of the lever member fixedly secured to the second end of the spring member, whereby the spring member and lever member together comprise a continuous appendage extending from the support member and supporting the wheel at a distal end, the spring member deflecting under loads applied between the support member and the wheel to move the wheel relatively closer to the support member under increasing loads.

BRIEF DESCRIPTION OF THE DRAWINGS

Further aspects and advantages of the present invention will become apparent from the following description taken together with the accompanying drawings in which:

FIG. 9 is a side view of the caster shown in FIG. 8;

FIG. 10 is a top view of the caster shown in FIG. 9;

FIG. 11 is a partial cross-sectional side view of the caster of FIG. 10 along line X–X';

DETAILED DESCRIPTION OF THE DRAWINGS

Figure 1:
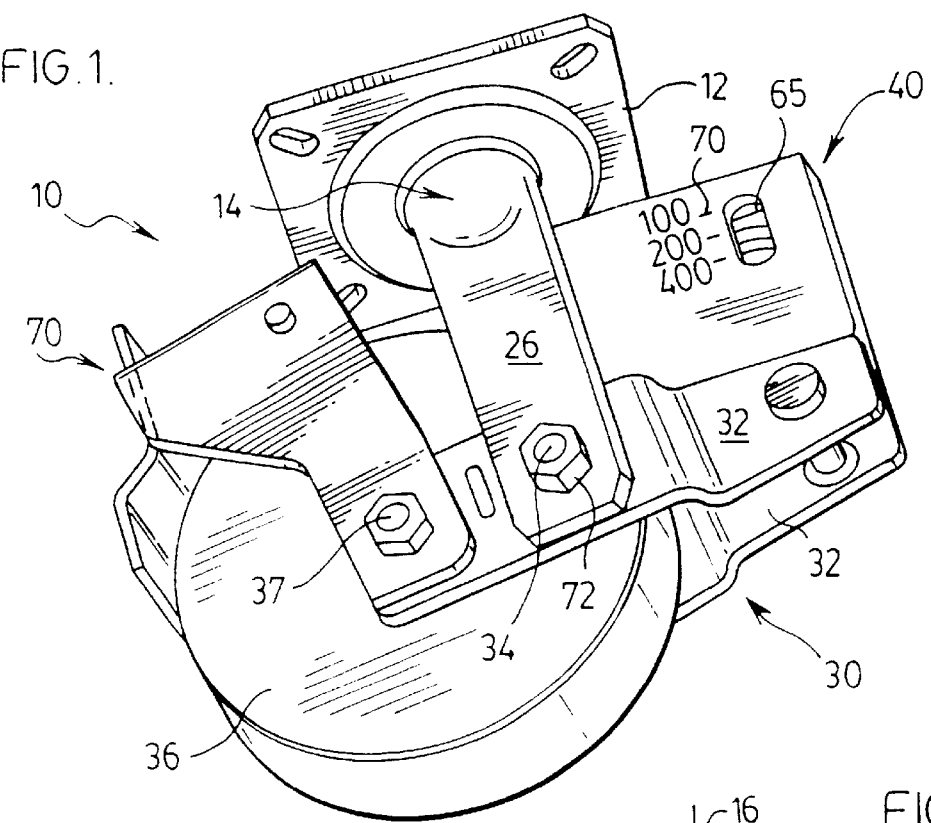
FIG. 1 is a pictorial view of a caster in accordance with a first embodiment of the present invention with a brake in a locked position.

FIGS. 1 to 7 illustrate a caster 10 in accordance with a first embodiment of the present invention.

Caster 10 has a mounting member 12 comprising a plate with holes for attachment by bolts or the like as to the bottom of, for example, a utility cart.

Mounting member 12 is coupled to a support member 14 for relative swiveling about a swivel axis 16. The swivel coupling between the mounting member 12 and support member 14 may be of any known type. A swivel coupling 15 is shown with two races of ball bearings 18 and 20 and an intermediate cup 22 and a lower disc 24 secured together by a bolt 24 coaxial with swivel axis 16.

Support member 14 includes the intermediate cup 22 from which two spaced, mirror-image legs 26 extend downwardly to their distal ends 28. The support member 14 includes a spring housing 40 secured to the legs 26.

A lever mechanism 30 has two mirror-image, spaced lever arms 32. Each lever arm 32 is coupled to a respective leg 26 of the support member 14 near the lower distal end 28 of the leg for pivoting about a pivot axis 34.

A wheel 36 is rotatably mounted on a wheel axle 37 between the two lever arms 32 at a rearward first end 39 of the lever arms for journalled rotation about a wheel axis 38 parallel the pivot axis 34.

Figure 4:
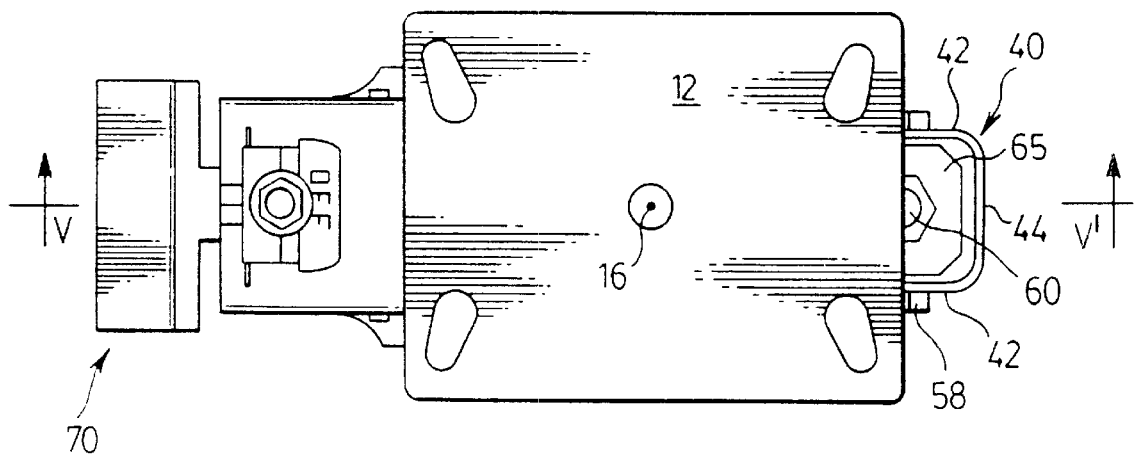
FIG. 4 is a top view of the caster of FIG. 2 with the brake in an unlocked position.
Figure 5:
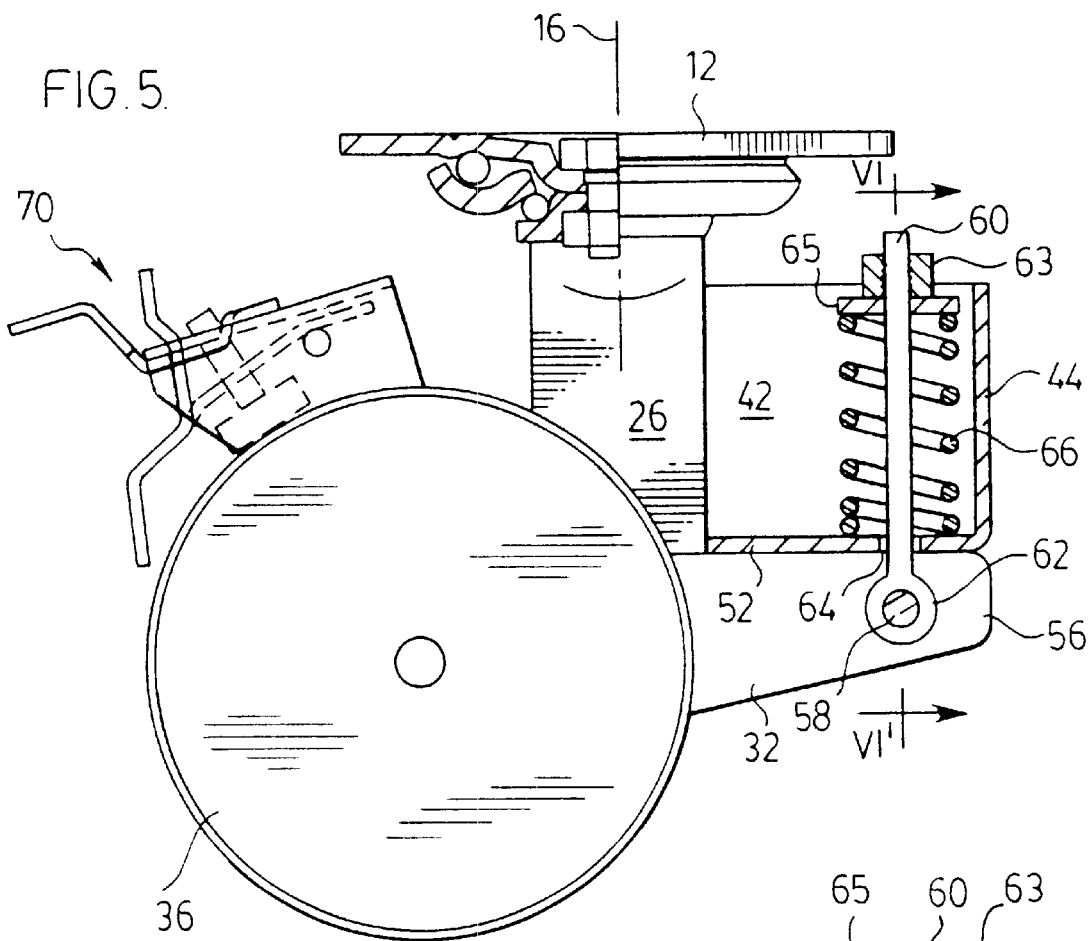
FIG. 5 is a partial cross-sectional view along line V–V' of FIG. 4.
Figure 6:
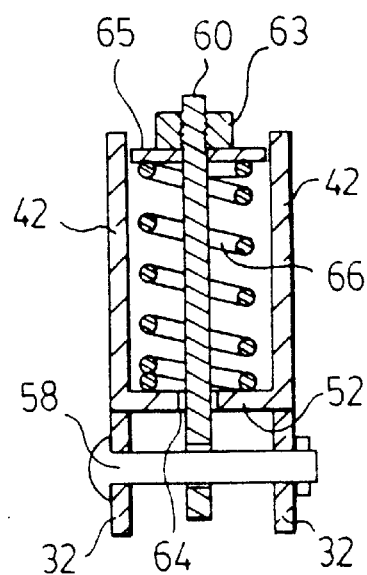
FIG. 6 is a cross-sectional view along section line VI–VI' of FIG. 5.

The spring housing 40 is of a U-shape as seen in top, plan view in FIG. 4 having two mirror image side members 42 joined by a bight member 44 at the forward edges of the side members. The side members 42 have rear edges which are fixedly secured to forward edges 50 of the legs 26 so that the spring housing 40 is supported in a cantilevered manner forward of the legs 26. As seen in FIGS. 5 and 6, the spring housing 40 has a base member 52 extending between the side members 42 near their bottom edges and fixedly secured to the side members 42 and bight member 44.

Lever arms 32 extend rearwardly of the legs 26 of the support member to underlie the spring housing 40 and carry at forward, second ends 56 of the lever arms a pivot bolt 58 extending between the arms 32 parallel the pivot axis 34. An anchor bolt 60 has an eyelet 62 at a lower end engaged about pivot bolt 58 and extends upwardly between the lever arms 32 through an opening 64 in base member 52 and into the interior of spring housing 40.

The uppermost end of anchor bolt 60 is threaded and carries a threaded nut 63 which engages a washer 65. A coil spring 66 is captured on the anchor bolt 60 between the washer 65 and base member 52 such that the spring 66 biases the lever mechanism 30 to draw the forward, second ends 56 of the lever arms 32 upwardly into engagement with the spring housing 40. In this regard, upper surfaces of the lever arms 32 and lower surfaces of the side members 42 serve to engage and provide a stop mechanism limiting rotation of the lever mechanism counterclockwise in a retracted position as seen in FIG. 5.

Each side member 42 of the support member 14 is provided with an indicator window 68 through which the washer 65 is visible.

Indicator markings 70 are provided adjacent the indicator window 68 as vertically spaced lines which assist a person viewing the caster to determine the relative location of the washer 65. Preferably, the lines represent quantified values of the loading to which the caster 10 is subjected.

By selection of an appropriate strength. spring 66 and by compression of the spring 66 to a desired amount by nut 63, the forces required move the washer 65 relative the indicator window can be quantified and the lines located to indicate actual loadings experienced by the caster 10, for example, in pounds or kilograms. Providing quantitative indications of loading is not necessary and merely having the indicator window 68 to permit viewing of the washer 65 at some positions can indicate, for example, whether loading may exceed desired maximums or be within a desired range.

Figure 2:
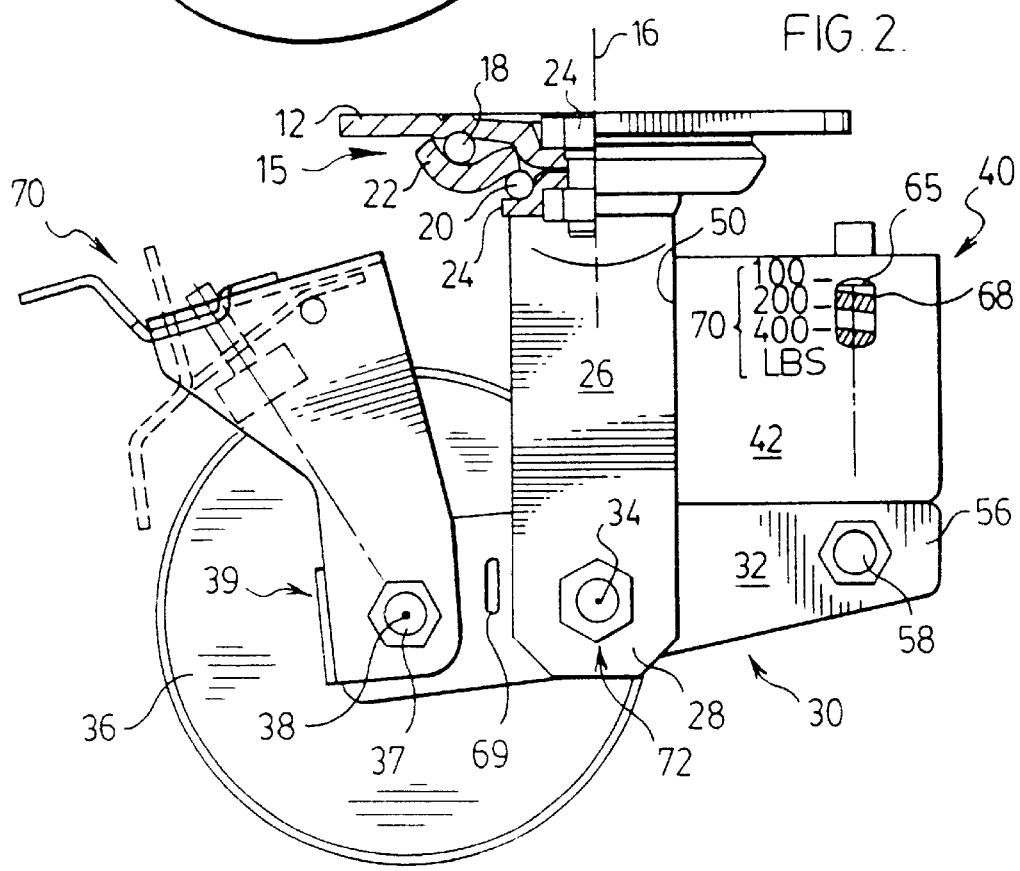
FIG. 2 is a side view of the caster of FIG. 1 in a retracted position showing the brake in an unlocked position in solid lines and in a locked position in dotted lines.
Figure 3:
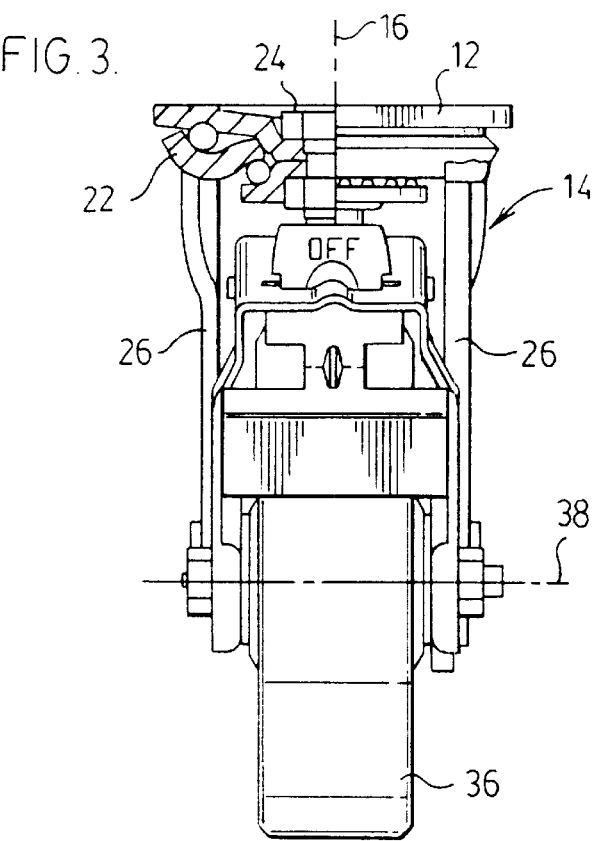
FIG. 3 is an end view of FIG. 2 with the brake in a locked position.
Figure 7:
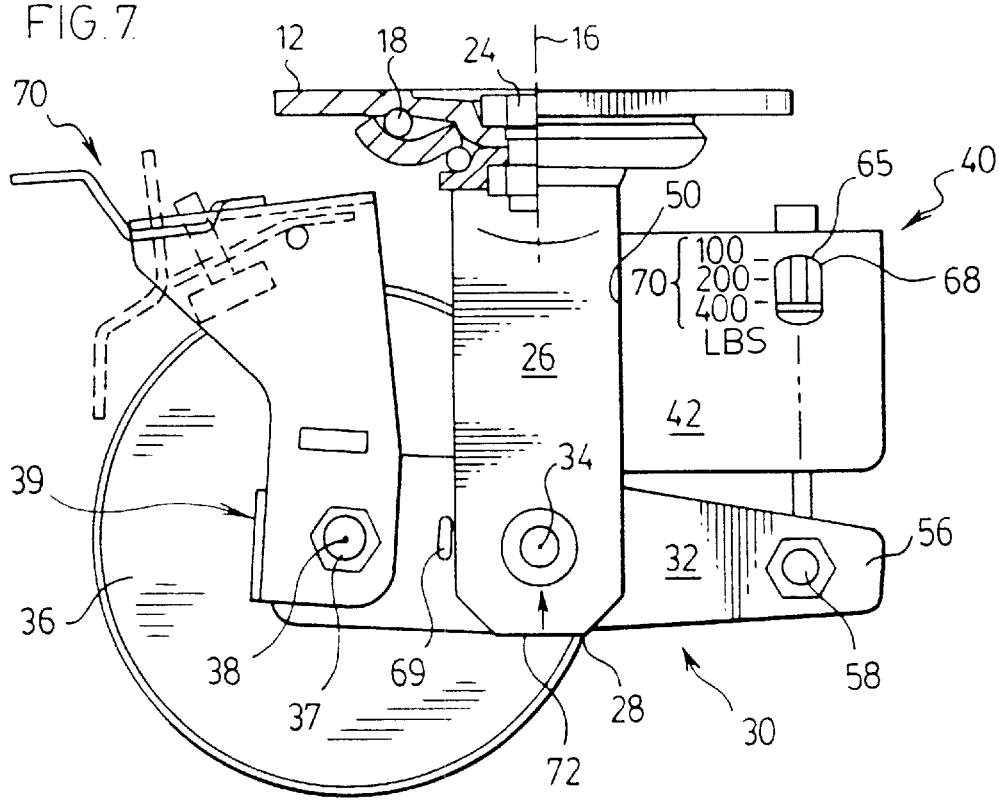
FIG. 7 is a side view of the caster of FIG. 1 the same as in FIG. 2 but with the caster in an extended position.

FIG. 2 shows the caster in a retracted position as may arise with no load or only a small load applied to the caster as indicated by the indicator washer 65 indicating a load of approximately 0 pounds. FIG. 7 shows the caster in an extended position when a substantial load has been applied. In FIG. 7, the indicator washer indicates a load of greater than 400 pounds. As seen in FIGS. 2 and 7, the lever arms 32 carry a stop protrusion 69 which engages the left-hand edge of the legs 32 and provide a stop mechanism limiting rotation of the lever mechanism clockwise in a fully extended position as seen in FIG. 7. Preferably, in use, the caster will not be used under loads in which the caster is in the fully extended position. A user can, of course, determine the load by visual inspection of the window 68.

FIGS. 1 to 6 also show a known brake mechanism 70 carried on the rear first end 39 of the lever arms and manually activatable between an unlocked position shown in solid lines in FIGS. 2 and 5 and in a locked position shown in dashed lines in FIGS. 2 and 5. In a locked position, the brake mechanism 70 prevents rotation of the wheel 36 about wheel axis 38.

The spring-loaded caster 10 shown in FIGS. 1 to 7 is merely one form of a spring caster. Many other forms and arrangements of spring casters are known including those in which the wheel is mounted for rotation about a wheel axis and supported to a load bearing member by a spring such that load applied deflects the spring and changes the relative location of the wheel relative its mounting. The springs may be compressed in a vertical direction as shown in FIGS. 1 to 6, or adapted to be compressed horizontally or at angles thereto taught by known spring-loaded casters. The indicator mechanism may be similarly oriented. Other forms of spring-loaded casters to which an indicator mechanism in accordance with the present invention is applicable include those taught by the following U.S. patents whose teachings are incorporated herein by reference:

U.S. Pat. No. 5,40,469 to Simonsen issued Mar. 28, 1995
U.S. Pat. No. 5,347,680 to Rippe issued Sep. 20, 1997
U.S. Pat. No. 3,041,656 to Goodall issued May 31, 1960
U.S. Pat. No. 4,534,433 to Burbank issued Aug. 13, 1985
U.S. Pat. No. 5,581,843 to Purnell issued Dec. 10, 1996
U.S. Pat. No. 2,942,290 to Segal issued May 14, 1957
U.S. Pat. No. 2,227,875 to Boden issued Jul. 8, 1938
U.S. Pat. No. 2,707,795 to Skupas issued May 10, 1955.

The embodiment of FIGS. 1 to 7 shows indicator windows 68 in side members 42. A similar indicator window could be provided in bight member 44. The indicator window could be provided on the lever mechanism 30 and an indicator pointer on the support member.

The indicator mechanism shown in FIGS. 1 to 7 is but one arrangement to visually illustrate the extent to which the spring is deflected. Many other arrangements may be provided preferably with a first indicator carried on the lever mechanism 30 and a second indicator carried on the support member 14, with the first and second indicators in juxtaposed cooperating relation to indicate relative positions.

For example, the washer could have a pointer extending therefrom to more directly point to an indicator on the support member. The washer could have at its outer periphery an axially extending flange painted different colors as, for example, green or red at different axial locations so that the color green or red would appear in a smaller window in the side members depending on the extent of compression of the spring and, therefore, relative movement of the washer.

The indicator mechanism is shown forward of the support legs but could be provided rearward thereof.

Many different forms and configurations of springs may be used including coil springs, disc springs, leaf springs, gas cylinders and the like. Compound spring arrangements may be used. The springs may comprise resilient metal or other materials such as resilient elastomeric materials, for example, compressible discs of rubber. The springs may be deflected under loading either to be compressed or expanded. Where the wheel is carried on an elongate lever, the wheel may be pivotably coupled to the lever at any point along the length of the lever spaced along the longitudinal of the lever from the point about which the lever pivots.

In the caster of FIGS. 1 to 7, the support member 14 and lever mechanism 30 are separate elements which are joined together at each side by two short bolt and nut connectors 72, one on each side joining a lever arm 32 with a respective leg 26 of the support member 14 so as to have the lever mechanism pivot about the pivot axis 34 journalled on the coaxially aligned bolt and nut connectors 72.

Reference is made to FIGS. 8 to 13 which show a second embodiment of a caster 10 in accordance with the present invention and in which the same reference numerals are used as in FIGS. 1 to 7 to show similar elements.

The caster 10 of FIGS. 8 to 12 is different from the caster of FIGS. 1 to 7, notably, in that the support member 14 and lever mechanism 30 are formed as a unitary flex element generally indicated as 74, preferably, consisting of one piece of sheet metal formed into a generally U-shape as by stamping and drawing. Alternately, support member 14 could be formed from plastic as by injection molding.

The flex member 74 is to be best understood as having three portions of which a first end portion is the support member 14 and a second end portion is the lever mechanism 30. A third portion is a resilient bridge 76 which is in between the support member 14. and lever mechanism 30 joining the support member 14 to the lever mechanism 30.

Figures 12, 13:
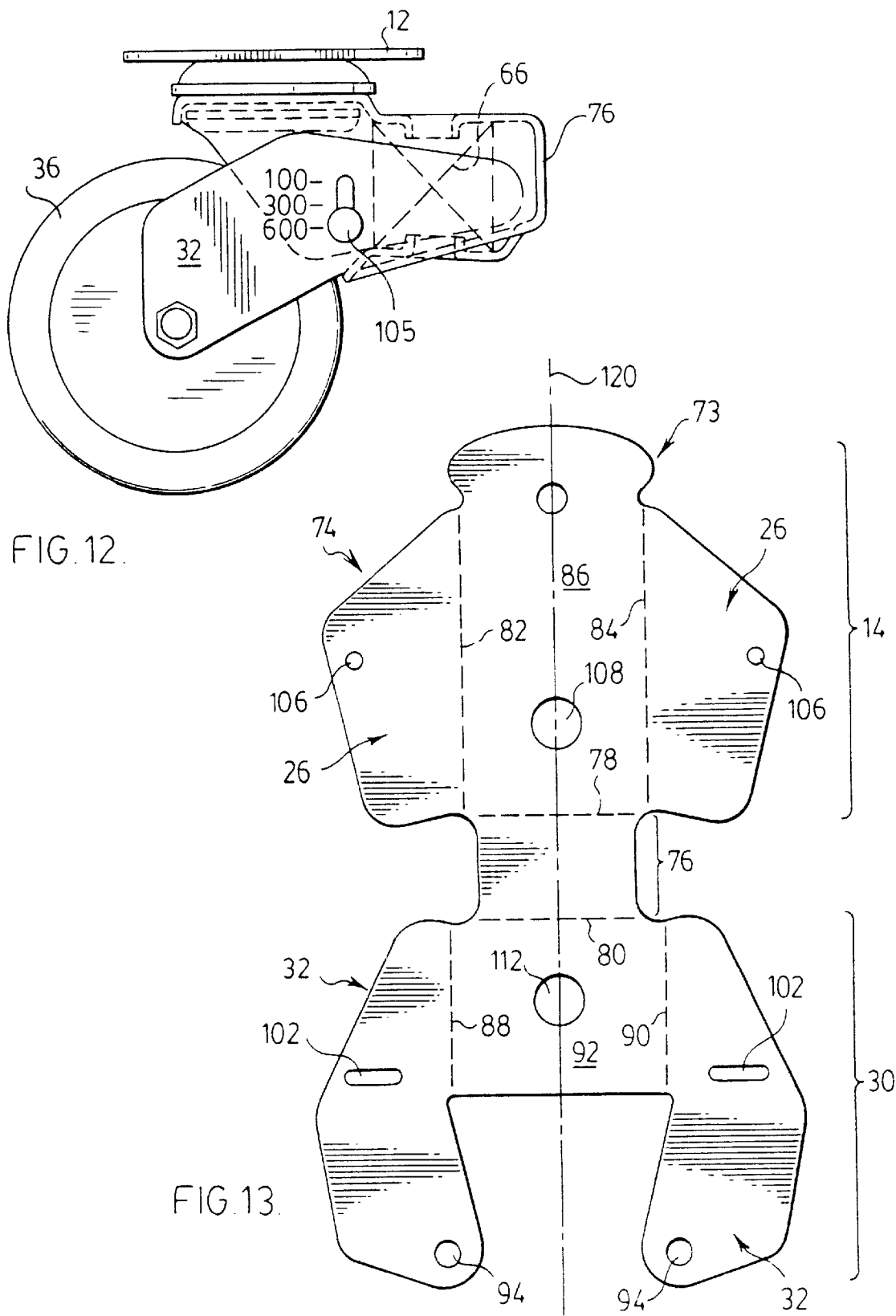
FIG. 12 is a side view similar to that of FIGS. 9 and 11, however, showing the caster in a fully compressed position.
FIG. 13 is a schematic plan view of a metal sheet from which a unitary flex element of the caster of FIG. 8 may be formed.

FIG. 13 schematically shows a plan view of a flat sheet 73 of metal from which the flex element 74 is to be formed by stamping and bending. The sheet 73 is symmetrical about a longitudinally extending center line 120.

The bridge 76 is indicated as comprising that portion between the dashed lines 78 and 80. At a first end of the bridge 76 at line 78, the bridge 76 joins an end of the support member 14. At a second end of the bridge 76 at line 80, the bridge 76 joins an end of the lever mechanism 30. The support member 14 is to be bent along dashed side lines 82 and 84 to have its legs 26 extend as side flanges along the sides of and normal to its central support panel 86. The lever mechanism 30 is to be bent along dashed side lines 88 and 90 to have its lever arms 32 extend as side flanges along the sides of and normal to its central lever panel 92. The lever arms 32 carry wheel axle openings 94 so that the wheel axle may extend therebetween.

Figure 8:
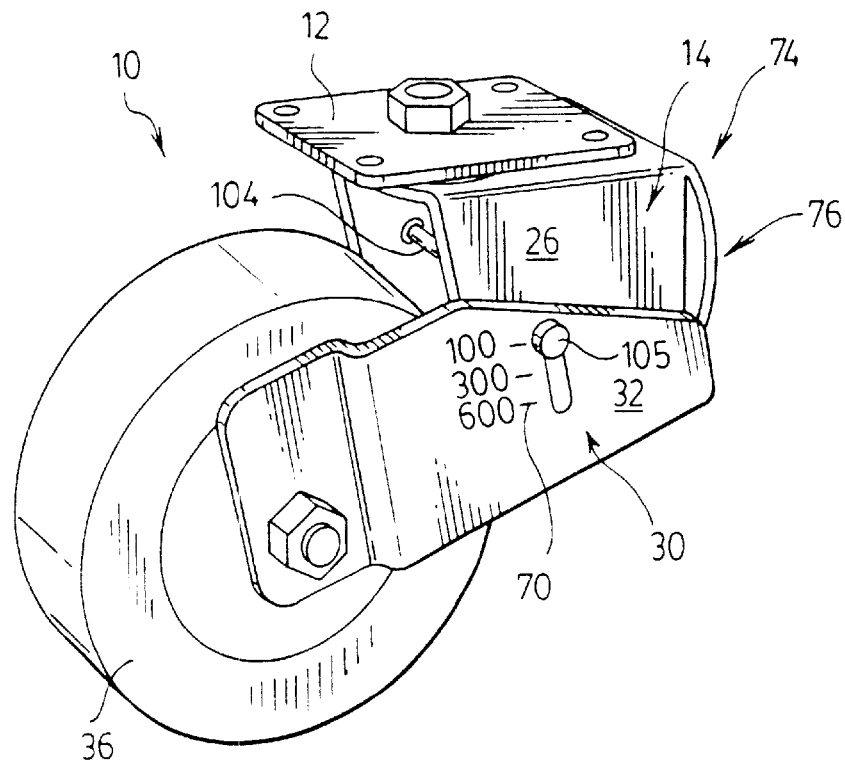
FIG. 8 is a pictorial view of a second embodiment of a caster in accordance with the present invention.

The flat sheet 73 is bent to form the flex element 74 as a U-shaped member as seen in FIG. 8.

On the U-shaped flex element 74, the center line 120 also assumes a U-shape and the center line lies in a flat plane indicated as section line X—X' in FIG. 10 when the flex element is in the extended position. The flex element 74 is configured so that in the flex element 74 deflecting to move between the extended and retracted positions, the center line is maintained substantially in such flat plane. Such controlled deflection of the flex member 74 may be accomplished to a large measure by the configuration of the bridge 76 joining the support member 14 and lever mechanism 30. However, in addition, lateral guide members may be provided on the support member 14 and lever mechanism 30 to constrain the support member 14 and lever mechanism 30 during relative movement so that the center line 120 is maintained in the flat plane.

With the support member 14 and the lever mechanism 30 suitably formed, stamped and/or bent to have the desired three-dimensional shape shown, the metal sheet 73 is bent so as to form the bridge 76 into a generally U or C-shape as best shown in FIG. 8 and with the support legs 26 and central support panel 86 to form an elongate channelway to rest inside a channelway formed by the lever arms 32 and central lever panel 52 extending parallel each other with outside surface 98 of each support leg 26 in close interfacing relation with inside surfaces 100 of the adjacent lever arm 32.

The channelway formed by the lever arms 32 and central lever portion 52 extends longitudinally parallel the center line 120 and opens towards the support member 14 to receive the support member 14 therein in the extended position with the support member 14 to move farther into the channelway of the lever mechanism 30 in moving toward the retracted position. The outside lateral surfaces 98 of each support leg 26 are in close interfacing relation with the inside lateral surfaces 100 of each lever arm 32 for engagement to constrain each during relative movement between the extended and retracted position to maintain the center line in alignment in the flat plane. Each lever arm 32 carries an elongate slot 102 to receive a limit pin 104 which extends through the pin opening 106 in the adjacent support leg 26. The limit pin 104 has an elongate central cylindrical portion 103 and an enlarged cylindrical head 105 at each end. The limit pin 104 extends across the full width of the caster as shown in dashed lines in FIG. 10, with its enlarged heads 105 disposed laterally outside the lever arms 32. The pin 104 and its heads 105, which are sized to be larger than the width of the slots 102 assist in preventing the lever arms 32 from spreading apart away from each other as could give rise to failure under excessive loading. The movement of the limit pins 104 in their respective elongate slots 102 in the lever arms 32 limits the extent to which the support member 14 and lever mechanism 30 may be deflected towards and away from each other by deflection of the flex element 74 over the resilient bridge 76.

The engagement of the limit pin 104 with the upper ends of the slots 102 provides a compression stop mechanism assisting in preventing further compression of the flex member. Similarly, the engagement of the limit pin 104 with the lower end of the slots 102 provides an expansion stop mechanism assisting in preventing further expansion of the flex member. Various other stop mechanism can be provided as, for example, bosses on legs 26 to engage the upper edge of legs 32.

The limit pin 104 may be formed by a bolt and nut. The limit pin 104 need not extend across the width of the caster and a separate bolt and nut or riveted member could be provided at each side. The head 105 of the limit pin 104 also serves as an indicator located proximate line markings 70 of an indicator gauge scale. Relative movement of the head 105 of the limit pin 104 in the slot 102 serves to indicate the extent of deflection and, therefore, the loading applied.

As best seen in FIGS. 11 and 13, the central support panel 86 has an opening 108 punched therein so as to form a downwardly extending circular boss 110. Similarly, the central lever panel 92 has an opening 112 punched therein so as to form an upwardly extending circular boss 114 which is axially aligned with boss 110. A coil spring 66 has a first end disposed about boss 110 and a second end disposed about boss 114 so as to retain the spring 66 between the support member 14 and the lever mechanism 30 adapted to bias them apart. The coil spring 66 is coaxial about a spring axis which lies in the flat plane in which the center line 120 lies. Preferably, in assembly, the spring will have a predetermined size and strength and will be captured between the support member 14 and lever mechanism 30 during bending of the bridge 76 into its U shape. Subsequently, the limit pins 104 may be inserted to retain the spring 66 in an initial portion with the lever mechanism 30 in an extended position relative the support member 14 as seen in FIGS. 9 and 11 with the limit pins 104 engaging the upper end of slots 102. On applying loading onto the caster, the load compresses the spring 66 and deflects the resistant bridge 76 so that the lever mechanism 30 may move relative the support member 14 to the retracted position as shown in FIG. 12 with the limit pins 104 engaging the lower end of slots 102.

The wheel axle 37 extends from one lever arm 32 to the other to secure the wheel 36 therebetween rotatable about the wheel axis 38. The limit pins 104 extends parallel the axis 38. The deflection of the flex element 74 about the bridge 76 effectively results in relative pivoting of the support member 12 and the bridging mechanism 30 about an imaginary pivot axis which is parallel the wheel axis 38 and located, for example, near to, or forward of, the bridge 76 but, in any event, spaced from the wheel axis 38 radially relative of the wheel axis 38. The bridge 76 provides a living hinge such that deflection of the bridge 76 provides for relative movement of the support member 12 and bridging member 30 about a rotational or imaginary axis parallel the wheel axis. This imaginary axis is not necessarily fixed relative the flex element but may move its relative location depending on load conditions. In deflection of the flex element 74, the wheel 36 is moved to different positions, however, the wheel axis 38 is maintained parallel, that is, the wheel axis 38 of the wheel in any position is parallel to the wheel axis when the wheel is in any other position to which the wheel can be deflected.

Figure 14:
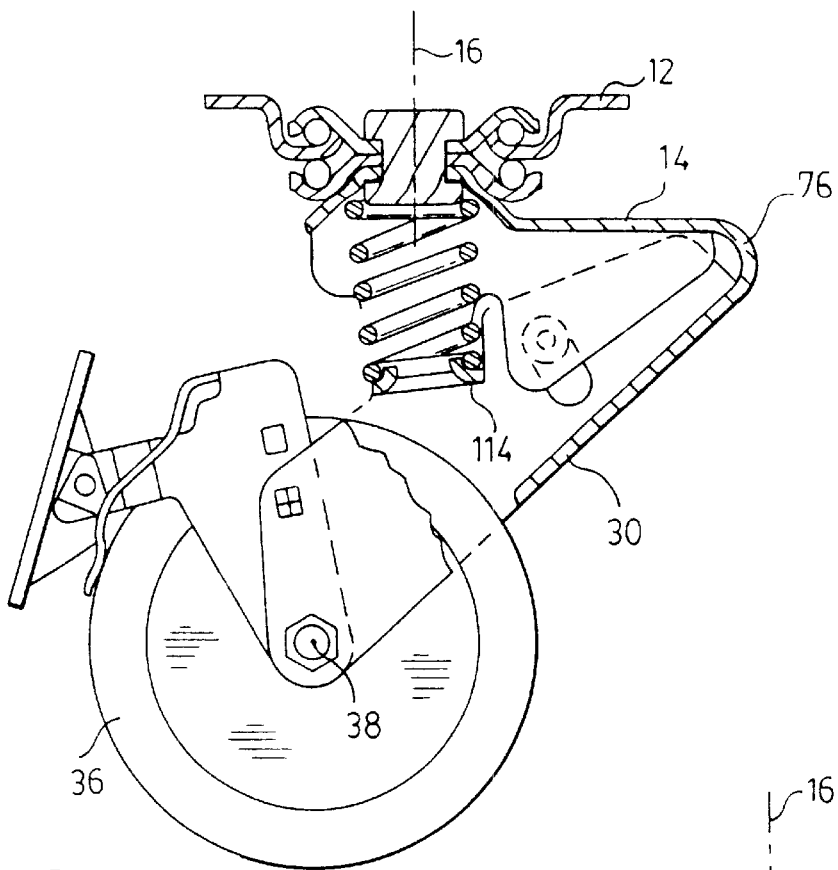
FIG. 14 is a schematic partially cross-sectional side view of a third embodiment of a caster in accordance with the present invention in an uncompressed position.
Figure 15:
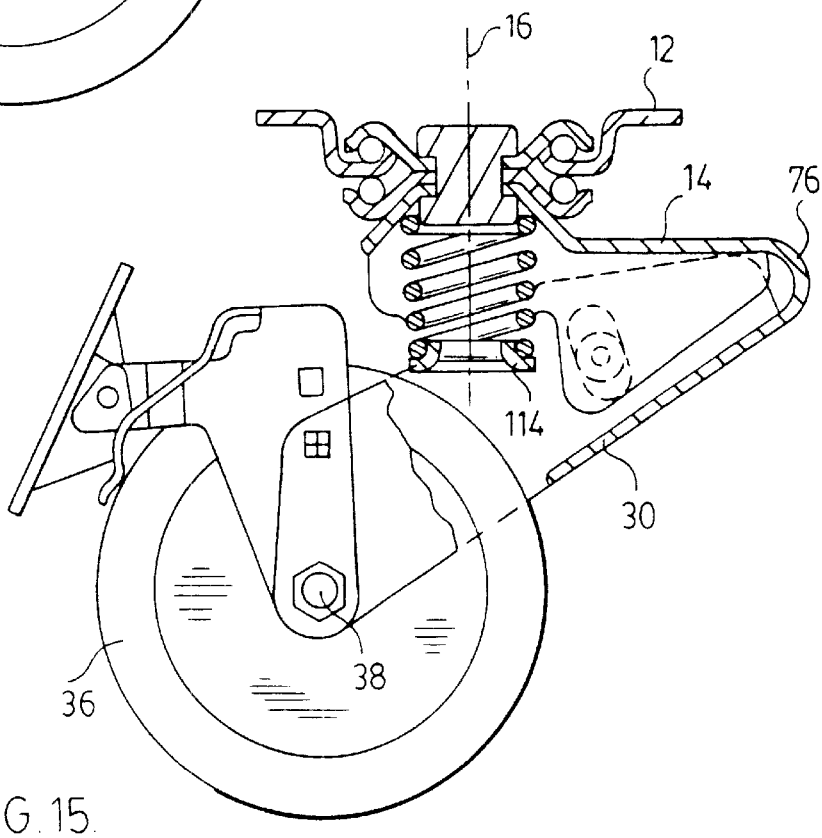
FIG. 15 is a view of the caster as in FIG. 14, however, in a compressed position.

Reference is made to FIGS. 14 and 15 which show schematic, partially sectioned side views of a third embodiment of a caster in accordance with the present invention. The third embodiment of FIGS. 14 and 15 is of substantially the same configurations as the second embodiment of FIGS. 8 to 13 and differs principally in the configuration of the flex element 74 and the location of the spring 66.

In FIGS. 14 and 15, the spring 66 has its upper end engaging the support member 14 coaxially about the swivel axis 16 and has its lower end engaging a circular boss 114 carried on the lever mechanism 30. In the compressed position shown in FIG. 15, the lower end of the spring 66 and the boss 114 are substantially coaxially with the swivel axis 16. In deflection of the resilient bridge 76 from the unloaded position of FIG. 14 to the compressed position of FIG. 15, the boss 114 is moved from being angled out of axial alignment with swivel axis 16 into becoming approximately normal the swivel axis 116 and coaxial therewith.

Bridge 76 is shown in FIGS. 14 and 15 as formed with a single curved portion as can be of assistance in controlling the deflection of the bridge 76.

The preferred embodiments shown such as in FIGS. 8 to 13 includes a mounting member 12 to which the support member 14 is secured for swiveling about a swivel axis 16. Elements of the swivel coupling are formed directly into the central support panel 86. In accordance with this invention, it is not necessary that the mounting member 12 be provided. The invention may be utilized without swiveling as by mounting the support member 14 directly and fixedly to an article. Such a wheel support assembly without the swivel mounting member is useful for non-swiveling casters.

The preferred second and third embodiments of FIGS. 8 and 14 show, in effect, two biasing devices which urge the support member 12 and the lever mechanism away from each other. These include firstly, the spring 66 and, secondly, the resilient bridge 76. The spring 66 is not necessary and the inherent resiliency of the flex element 74 and, in particular, of the bridge 76 may be used alone to provide for deflection. Of course, depending on the loading and deflection characteristics desired, the relative spring strength and resiliency of the flex element 24 and its bridge 76 can be appropriately designed and selected.

FIG. 11 shows the resilient bridge 76 in side cross-section as having a U-shape with a straight middle portion which merges into two curved portions. FIG. 14 shows the bridge as having a U-shape with a single curved portion. The nature of the bridge 76 is to be appreciated as affecting its resiliency and the manner in which it deflects.

A person skilled in the art can alter the deflection characteristics many ways, for example, by changing the radius of the curved portions and by substituting for the straight middle portion a convexly or concavely or complexly curved member. Additionally, the bridge 76 could have stiffening embosses formed therein at various locations to change deflection. For example, as a stiffening emboss, a rib could be formed in the bridge 76 which extends parallel a longitudinal axis 120 of the blank as indicated in FIG. 13 about which the blank is symmetrical. Such ribs could be provided, for example, only over the curved portion of the bridge 76 or one of the curved portions.

The embodiments of FIG. 8 and 14 show the flex element 74 as stamped from a single piece of metal. Rather than comprise a single piece of metal, the bridge 76 could be provided as a separate piece of resilient material such as a length of spring steel which can be secured as by rivets at one end to the support member 14 and at its other end to the lever mechanism 30. After assembly, the flex element 74 would be a unitary element. Alternatively, a flat piece of sheet metal could be provided to overlie the bridge 76 of the unitary piece of metal in FIG. 13 and be secured to the support member 14 at one end and the lever mechanism 30 as by rivets so as to provide a secondary spring as a leaf spring to become tensioned when the bridge 76 is bent to its U-shape.

It is not essential, but rather preferred, that the embodiments of FIGS. 8 and 14 have an indicator mechanism to indicate the extent of loading. Various indicator mechanisms may be provided other than the use of the limit pins 104 also as an indicator.

The embodiment of FIGS. 8 to 13 preferably has at least limit pin 104, however, such a mechanism to limit either expansion or compression is not necessary. The bridge 76 can itself provide adequate resistance to expansion beyond a maximum expansion which would permit the spring 66 from becoming disengaged from between the bosses. Maximum compression could be limited merely by the lever legs engaging the central lever panel 92 or by other tabs, shoulders or the like being provided on the lever arms and/or support legs to interact between the lever arms 32 and the support legs 26.

The embodiments of FIGS. 8 and 14 preferably have the unitary flex element 74 formed from a sheet of metal as shown. The flex element may be formed from other materials and/or composites as, for example, laminates of various materials. The flex element 74 can be formed from plastic or nylon material. For example, a flex element 74 in a similar three-dimensional form to that shown in FIG. 8 could be injection molded from plastic as one piece. A flex element 74 made by injection molding could have varying shape, thickness, reinforcing ribs and the like to provide desired strength and flexibility having regard to the application intended for the resultant caster.

Preferred casters as seen in FIGS. 8 and 14 may be made adaptable to receive light loading in the range of 0 to 50 pounds or much greater loads up to thousands of pounds of loads and greater.

Preferred casters use a steel sheet for flex element 74, however, other metals such as aluminum could be used either in sheet form or possibly as a cast part.

While the embodiment of FIGS. 8 and 14 show legs 26 inside of lever arms 32, this is not necessary. Legs 26 could be outside of lever arms 32. It is preferred that the legs 26 interact with the lever arms 32 and assist in keeping the central support panel 86 and the central lever panel 92 in alignment as during deflection and/or to assist in taking any lateral loading. It is to be appreciated that other mechanisms could be provided and the legs 26 and lever arms 32 reduced and/or eliminated.

The three embodiments show wheel 36 journalled on wheel axle 37. The wheel axle 37 is fixed against movement relative the lever mechanism. It is to be appreciated that a known floating axle arrangement may be substituted. With a floating axle arrangement, a spring biased mechanism is provided between the lever mechanism 30 and the fixed axle 37 which permits spring biased movement normal the axle depending on loads applied to the caster.

The present invention has been described with reference to preferred embodiments. Many modifications and variations will now occur to those skilled in this art. For a definition of the invention, reference is made to the following claims.

We claim:

1. A caster assembly comprising a mounting member mountable to an article, a support member having a central cup portion and two legs extending therefrom, the central cup portion mounted to the mounting member for swiveling about a support axis, the two leg members extending from opposite sides of the central cup portion away from the mounting member generally parallel to each other spaced from each other straddling the support axis, an elongate lever pivotably coupled to the support member for pivoting of the lever relative the support member about a pivot axis generally normal to the support axis, the lever having two elongate arms extending generally parallel to each other spaced from each other straddling the support axis and parallel to the legs of the support, each of the two legs of the support member being located adjacent a respective one of the arms of the lever with both legs either laterally inward of their respective arms or laterally outward of their respective arms a wheel rotatably mounted to the lever disposed between the arms of the lever and between the legs of the support member, the wheel journalled on a wheel axle extending between the arms for rotation about a wheel axis spaced from the pivot axis and parallel to the pivot axis, a spring member disposed between the lever and the support member biasing the lever to pivot relative the support member about the pivot axis in a clockwise direction to an unloaded configuration and that such to pivot the lever relative the support member about the pivot axis in an opposite, counterclockwise direction requires deflection of the spring member with the spring member requiring increasing forces for deflection of the spring as the lever is pivoted further in the counterclockwise direction, a support indicator carried by a leg of the support member spaced from the pivot axis radially relative the pivot axis, a lever indicator carried by an arm of the lever spaced from the pivot axis radially relative the pivot axis, a first of the support indicator and lever indicator comprising a scale having a plurality of markings each indicating a different extent of deflection, the support indicator and lever indicator disposed on their respective arm and leg in juxtapositioned complementary relation to move relative each other in a first linear direction only on pivoting of the lever relative the support member about the pivot axis in the clockwise direction and to move relative each other in a second linear direction only on pivoting of the lever relative the support member about the pivot axis in the counterclockwise direction, wherein the position relative the scale of the one of the support indicator and lever indicator which does not comprise the scale provides a visual indication of the extent of deflection of the spring member.

2. A caster assembly as claimed in claim 1 wherein the lever has a first end and a second end, the pivot axis located intermediate the first end and the second end, the wheel axis located on the lever proximate the first end, and the spring member coupled to the lever proximate the second end.

3. A caster assembly as claimed in claim 1 wherein the lever extends from a supported end of the lever where the lever is coupled to the support member to a remote distal end of the lever on which the wheel is mounted, the lever proximate the supported end comprising a resilient section adapted to resiliently deflect to provide for pivoting of the lever relative the support member about the pivot axis.

4. A caster assembly as claimed in claim 3 wherein the wheel axis is located on the lever proximate the remote distal end.

5. A caster assembly as claimed in claim 1 wherein the lever is pivotably coupled to the support member for pivoting of the lever relative the support member about the pivot axis via a journalled coupling coaxially about the pivot axis.

6. A caster assembly as claimed in claim 1 wherein the lever has a first end and a second end, the pivot axis located intermediate the first end and the second end, the wheel axis located on the lever proximate the first end, and the spring coupled to the lever proximate the second end.

7. A caster assembly as claimed in claim 1 wherein the lever extends from a supported end of the lever where the lever is coupled to the mounting member to a remote distal end of the lever on which the wheel is mounted, the lever proximate the supported end comprising a resilient section adapted to resiliently deflect to provide for pivoting of the lever relative the mounting member about the pivot axis.

8. A caster assembly as claimed in claim 7 wherein the wheel axis is located on the lever proximate the remote distal end.

9. A caster assembly as claimed in claim 1 wherein the lever is pivotally coupled to the support member for pivoting of the lever relative the support member about the pivot axis via an axle member coaxial with the pivot axis.

10. A caster assembly as claimed in claim 1 wherein the lever is pivotably coupled to the support member for pivoting of the lever relative the support member about the pivot axis via a journalled coupling coaxially about the pivot axis.

11. A caster as claimed in claim 1 including a maximum stop mechanism to limit pivoting of the lever relative the support member in the counterclockwise direction to a desired maximum.

12. A caster as claimed in claim 1 including a stop mechanism to prevent pivoting of the lever relative the support member except between a retracted position and an extended position.

13. A caster as claimed in claim 1 wherein the lever indicator and support indicator are carried on the caster assembly to permit visual inspection to indicate the extent of deflection of the spring member.

14. A caster as claimed in claim 1 wherein the scale represents a quantitative indication of loading transferred via the caster assembly onto the wheel.

* * * * *